United States Patent
Keahey et al.

(10) Patent No.: US 10,599,979 B2
(45) Date of Patent: *Mar. 24, 2020

(54) CANDIDATE VISUALIZATION TECHNIQUES FOR USE WITH GENETIC ALGORITHMS

(71) Applicant: International Business Machines Corporation, Armonk, NY (US)

(72) Inventors: T. Alan Keahey, Naperville, IL (US); Daniel J. Rope, Reston, VA (US); Graham J. Wills, Naperville, IL (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/480,422

(22) Filed: Apr. 6, 2017

(65) Prior Publication Data
US 2017/0213135 A1 Jul. 27, 2017

Related U.S. Application Data

(63) Continuation of application No. 14/862,562, filed on Sep. 23, 2015.

(51) Int. Cl.
*G06N 3/12* (2006.01)
*G06T 11/20* (2006.01)

(52) U.S. Cl.
CPC ............ *G06N 3/126* (2013.01); *G06T 11/206* (2013.01)

(58) Field of Classification Search
None
See application file for complete search history.

(56) References Cited

U.S. PATENT DOCUMENTS 5,121,467 A * 6/1992 Skeirik ............... G06N 3/0427 706/10
6,012,015 A * 1/2000 Tubel ................. E21B 41/0035 702/6

(Continued)

FOREIGN PATENT DOCUMENTS

CN 103077288 A * 5/2013
WO 2009154484 A2 12/2009

(Continued)

OTHER PUBLICATIONS

Gotz, D. et al. (Feb. 2009). Behavior-driven visualization recommendation. In Proceedings of the 14th international conference on Intelligent user interfaces (pp. 315-324). ACM. DOI:10.1145/1502650.1502695 (Year: 2009).*

(Continued)

*Primary Examiner* — Kamran Afshar
*Assistant Examiner* — Benjamin J Buss
(74) *Attorney, Agent, or Firm* — Michael O'Keefe

(57) ABSTRACT

According to one embodiment, a method for generating a plurality of candidate visualizations. The method may include receiving a scenario description. The method may also include collecting a plurality of expert data using a training system based on the received scenario description. The method may further include generating at least one predictive model based on the collected plurality of expert data in order to execute the at least one generated predictive model during an application of a plurality of genetic algorithms.

18 Claims, 7 Drawing Sheets

(56) References Cited

U.S. PATENT DOCUMENTS

| | | | |
|---|---|---|---|
| 7,072,899 B2 | 7/2006 | Lokken | |
| 7,089,261 B2 | 8/2006 | Hladik, Jr. | |
| 7,366,719 B2 | 4/2008 | Shaw | |
| 7,426,520 B2 | 9/2008 | Gorelik et al. | |
| 7,463,263 B2 | 12/2008 | Gilboa | |
| 7,584,415 B2 | 9/2009 | Cory et al. | |
| 7,603,326 B2 | 10/2009 | Bonabeau et al. | |
| 8,117,139 B2 | 2/2012 | Bonabeau et al. | |
| 8,132,122 B2 | 3/2012 | Risch et al. | |
| 8,301,585 B2 | 10/2012 | Mourey et al. | |
| 8,352,400 B2 | 1/2013 | Hoffberg et al. | |
| 8,356,000 B1* | 1/2013 | Koza | G06N 3/126 706/13 |
| 8,531,451 B2 | 9/2013 | Mital et al. | |
| 8,838,510 B2 | 9/2014 | Baughman et al. | |
| 9,230,440 B1* | 1/2016 | Penilla | G08G 1/145 |
| 9,336,268 B1* | 5/2016 | Moudy | G06F 17/30412 |
| 9,418,283 B1* | 8/2016 | Natarajan | G06K 9/00463 |
| 9,576,196 B1* | 2/2017 | Natarajan | G06K 9/3258 |
| 2003/0130996 A1 | 7/2003 | Bayerl et al. | |
| 2004/0117239 A1* | 6/2004 | Mittal | G06Q 30/02 705/7.32 |
| 2005/0102325 A1 | 5/2005 | Gould | |
| 2005/0192680 A1* | 9/2005 | Cascia | G05B 13/027 700/29 |
| 2006/0195204 A1* | 8/2006 | Bonabeau | G06N 3/126 700/83 |
| 2007/0112840 A1* | 5/2007 | Carson | G06Q 10/04 707/999.102 |
| 2008/0065685 A1 | 3/2008 | Frank | |
| 2008/0077451 A1* | 3/2008 | Anthony | G06Q 10/10 705/4 |
| 2008/0104101 A1* | 5/2008 | Kirshenbaum | G06F 17/30539 |
| 2009/0096812 A1 | 4/2009 | Boixel et al. | |
| 2009/0105984 A1 | 4/2009 | Wen et al. | |
| 2009/0327883 A1 | 12/2009 | Robertson et al. | |
| 2010/0194778 A1 | 8/2010 | Robertson | |
| 2011/0113003 A1* | 5/2011 | Roy | G01N 23/00 706/52 |
| 2011/0261049 A1 | 10/2011 | Cardno et al. | |
| 2011/0316884 A1* | 12/2011 | Giambalvo | G06F 17/30058 345/660 |
| 2012/0136666 A1* | 5/2012 | Corpier | H04L 12/2829 704/275 |
| 2012/0159620 A1* | 6/2012 | Seifert | H04L 63/1416 726/22 |
| 2012/0245435 A1* | 9/2012 | Corpier | A61B 5/746 600/300 |
| 2012/0313949 A1 | 12/2012 | Rope et al. | |
| 2013/0103677 A1 | 4/2013 | Chakra et al. | |
| 2013/0132042 A1 | 5/2013 | Chan | |
| 2013/0166337 A1 | 6/2013 | MacGregor | |
| 2013/0265319 A1 | 10/2013 | Fisher et al. | |
| 2014/0004489 A1 | 1/2014 | Kim et al. | |
| 2014/0025690 A1 | 1/2014 | Tareen et al. | |
| 2014/0039975 A1 | 2/2014 | Hill | |
| 2014/0049546 A1 | 2/2014 | Wang et al. | |
| 2014/0052731 A1 | 2/2014 | Dahule et al. | |
| 2014/0108135 A1 | 4/2014 | Osborn | |
| 2014/0114629 A1 | 4/2014 | Jojgov | |
| 2014/0156331 A1* | 6/2014 | Cordasco | G06Q 10/06311 705/7.15 |
| 2014/0205977 A1 | 7/2014 | Bak et al. | |
| 2014/0214335 A1 | 7/2014 | Siefert | |
| 2014/0229164 A1* | 8/2014 | Martens | G06F 17/241 704/9 |
| 2014/0247268 A1 | 9/2014 | Drucker | |
| 2014/0267367 A1 | 9/2014 | Chong et al. | |
| 2014/0278738 A1 | 9/2014 | Feit et al. | |
| 2014/0279730 A1* | 9/2014 | Gamon | G06N 20/00 706/12 |
| 2014/0354650 A1 | 12/2014 | Singh et al. | |
| 2014/0358999 A1 | 12/2014 | Rabinowitz et al. | |
| 2014/0359552 A1* | 12/2014 | Misra | G06F 8/36 717/100 |
| 2015/0002518 A1 | 1/2015 | Nakajima | |
| 2015/0007074 A1 | 1/2015 | Mackinlay et al. | |
| 2015/0161805 A1 | 6/2015 | Glazer | |
| 2015/0220972 A1* | 8/2015 | Subramanya | G06Q 30/0246 705/14.45 |
| 2015/0278371 A1 | 10/2015 | Anand | |
| 2015/0279371 A1 | 10/2015 | Fujioka | |
| 2015/0339301 A1 | 11/2015 | Paalborg et al. | |
| 2015/0347489 A1* | 12/2015 | Sherwin | G06Q 50/184 707/722 |
| 2016/0104311 A1 | 4/2016 | Allyn | |
| 2016/0217578 A1* | 7/2016 | Can | G01V 3/12 |
| 2016/0335497 A1* | 11/2016 | Williams | G06F 17/30256 |
| 2016/0342910 A1 | 11/2016 | Chu et al. | |
| 2016/0350275 A1 | 12/2016 | Keahey et al. | |
| 2016/0379084 A1 | 12/2016 | Keahey | |
| 2017/0083814 A1 | 3/2017 | Keahey et al. | |
| 2017/0213135 A1 | 7/2017 | Keahey | |
| 2018/0004811 A1 | 1/2018 | Keahey | |
| 2018/0173765 A1 | 6/2018 | Keahey | |

FOREIGN PATENT DOCUMENTS

| | | | |
|---|---|---|---|
| WO | 2014210521 A1 | 12/2014 | |
| WO | WO-2015077896 A1 * | 6/2015 | G06Q 30/02 |

OTHER PUBLICATIONS

Jain, A. K., et al. (2000). Statistical pattern recognition: A review. IEEE Transactions on pattern analysis and machine intelligence, 22(1), 4-37. DOI:10.1109/34.824819 (Year: 2000).*

Voigt, M. et al. (Feb. 2012). Context-aware recommendation of visualization components. In the Fourth International Conference on Information, Process, and Knowledge Management (eKNOW) (pp. 101-109). (Year: 2012).*

Sun, Y. et al. (Jun. 2010). Articulate: A semi-automated model for translating natural language queries into meaningful visualizations. In International Symposium on Smart Graphics (pp. 184-195). Springer, Berlin, Heidelberg. DOI:10.1007/978-3-642-13544-6_18 (Year: 2010).*

Shen, J. et al. (Jan. 2006). A hybrid learning system for recognizing user tasks from desktop activities and email messages. In Proceedings of the 11th international conference on Intelligent user interfaces (pp. 86-92). ACM. DOI:10.1145/1111449.1111473 (Year: 2006).*

Jin, Y. (2005). A comprehensive survey of fitness approximation in evolutionary computation. Soft computing, 9(1), 3-12. First online Oct. 13, 2003. DOI:10.1007/s00500-003-0328-5 (Year: 2005).*

Nagypál, G. et al. (2005). Applying the semantic web: The VICODI experience in creating visual contextualization for history. Literary and Linguistic Computing, 20(3), 327-349. DOI:10.1093/llc/fqi037 (Year: 2005).*

Palotai, Z. et al. (Jun. 2014). Labelmovie: Semi-supervised machine annotation tool with quality assurance and crowd-sourcing options for videos. In Content-Based Multimedia Indexing (CBMI), 2014 12th International Workshop on (pp. 1-4). IEEE. DOI: 10.1109/CBMI.2014.6849850 (Year: 2014).*

Jin, Y. (2005). A comprehensive survey of fitness approximation in evolutionary computation. Soft computing, 9(1), 3-12. DOI: 10.1007/s00500-003-0328-5 (Year: 2005).*

Jin, Y. et al. (2002). A framework for evolutionary optimization with approximate fitness functions. IEEE Transactions on evolutionary computation, 6(5), 481-494. DOI: 10.1109/TEVC.2002.800884 (Year: 2002).*

Bonissone, P.P. (Jun. 2012). "Lazy meta-learning: creating customized model ensembles on demand". In IEEE world congress on computational intelligence (pp. 1-23). Springer, Berlin, Heidelberg. (Year: 2012).*

Kosala, R. et al. (2000). "Web mining research: A survey". ACM Sigkdd Explorations Newsletter, 2(1), 1-15. (Year: 2000).*

Sciacca, E. et al. (Feb. 2013). "Visivo workflow-oriented science gateway for astrophysical visualization". In 2013 21st Euromicro

(56) References Cited

OTHER PUBLICATIONS

International Conference on Parallel, Distributed, and Network-Based Processing (pp. 164-171). IEEE. (Year: 2013).*

Klímek, J. et al. (Apr. 2014). "Application of the Linked Data Visualization Model on Real World Data from the Czech LOD Cloud". In LDOW 2014. (Year: 2014).*

Carty, D.M. (2011). "An analysis of boosted regression trees to predict the strength properties of wood composites". Master's Thesis, University of Tennessee. (Year: 2011).*

Sledz, D.A. & Coomes, D.E. (2007). "A dynamic three-dimensional network visualization program for integration into CyberCIEGE and other network visualization scenarios". Naval Postgraduate School Monterey CA. (Year: 2007).*

Poli, R. et al. (1991). "A Neural Network Expert System for Diagnosing and Treating Hypertension". Computer. vol. 24, Issue: 3, Mar. 1991. IEEE. pp. 64-71. DOI: 10.1109/2.73514 (Year: 1991).*

Buche, D. et al. (2005). "Accelerating evolutionary algorithms with Gaussian process fitness function models". IEEE Transactions on Systems, Man, and Cybernetics, Part C (Applications and Reviews). vol. 35, Issue: 2, May 2005. pp. 193-194. DOI: 10.1109/TSMCC. 2004.841917 (Year: 2005).*

IBM: List of IBM Patents or Patent Applications Treated As Related (Appendix P), Apr. 12, 2017, pp. 1-2.

Keahy, et al., Pending U.S. Appl. No. 15/199,071, filed Jun. 30, 2016, titled "Determining a Collection of Data Visualizations", pp. 1-44.

Chu et al., "Automatic Time Series Exploration for Business Intelligence Analytics," Application and Drawings, Filed on May 18, 2015, p. 1-53, U.S. Appl. No. 14/715,378.

Farooq et al., "An Interactive Visualization of Genetic Algorithm on 2-D Graph," Proceedings of the 10th IEEE International Conference on Cognitive Informatics and Cognitive Computing (ICCI*CC'11), Aug. 18-20, 2011, p. 144-151, IEEE, Banff, Alberta, Canada.

Forbus, "Using Evolutionary Algorithms to Generate Multi-View Visualization Layouts," University of Oklahoma Graduate College Thesis, 2012, p. 1-82, Norman, Oklahoma.

Hart et al., "Gavel—A New Tool for Genetic Algorithm Visualization," IEEE Transactions on Evolutionary Computation, Aug. 2001, p. 335-348, vol. 5, No. 4, IEEE.

Keahey et al., "Determining User Preferences for Data Visualizations," Application and Drawings, Filed on Jun. 29, 2015, p. 1-38, U.S. Appl. No. 14/753,196.

Kinch, "Computer-Aided Design of Computer Architectures Using Interactive Graphic Representation," University of Illinois at Urbana-Champaign Master's Thesis, Dec. 1978, 135 Pages, Report No. UIUCDCS-R-78-952, IP.com No. 000151435, Software Patent Institute.

Li, "Direct Manipulation of Integrated Documents: An Approach to Interactively Manipulate Spatial Relationships Based on Constraint Programming Techniques," Royal Institute of Technology Technical Report, 1989, p. 1-81, IP.com No. 000150287, Software Patent Institute, Stockholm, Sweden.

Mell et al., "The NIST Definition of Cloud Computing," National Institute of Standards and Technology, Sep. 2011, p. 1-3, Special Publication 800-145.

Lu et al.; "Data Visualization of Web Services With Parallel Coordinates and NodeTrix", Services Computing (SCC), 2014 IEEE International Conference on, Jun. 27-Jul. 2, 2014, pp. 766-773.

Collins et al.; VisLink: Revealing Relationships Amongst Visualizations, Visualization and Computer Graphics, IEEE Transactions on, vol. 13, No. 6, Nov./Dec. 2007, pp. 1192-1199.

Rusu et al., "Document Visualization Based on Semantic Graphs", Information Visualization, 2009 IEEE 13th International Conference on, vol. 13, No. 6, Nov./Dec. 2007, pp. 292-297.

IBM: List of IBM Patents or Patent Applications Treated As Related (Appendix P), May 7, 2018, p. 1-2.

Agrawal, R. et al., "Querying Shapes of Histories", In. Proc. of the 21st Very Large Data Bases Conference, 1995 (best date available), pp. 1-13.

Bista et al., "Multifaceted Visualization of Annotated Social Media Data", 2014 IEEE International Congress on Big Data, 2014, p. 699-706, IEEE Computer Society.

Cooper et al., "The Effects of Data and Graph Type on Concepts and Visualizations of Variability", Journal of Statistics Education, 2010, p. 1-16, vol. 18, No. 2.

Edwards, J. (Jul. 2015). "Visualization of Data Flow Graphs for In-Situ Analysis" (Doctoral dissertation, Technische Universitat Berlin). Jul. 31, 2015. (Year 2015).

Mladenic, D. (1999). "Text-learning and related intelligent agents: a survey". IEEE intelligent systems and their applications, 14(4), 44-54. (Year: 1999).

Rivera, S. et al. (2014). "Proposing a framework for crowd-sourced green infrastructure design". Int'l Environmental Modelling and Software Society (iEMSs), 7th Intl. Congress on Env. Modelling and Software. (Year 2014).

Wagner, M. etal. (Nov. 2014). :Problem characterization and abstraction for visual analytics in behavior-based malware pattern analysis. In Proceedings of the Eleventh Workshop on Visualization for Cyber Security(pp. 9-16). ACM. (Year: 2014).

\* cited by examiner

CANDIDATE VISUALIZATION TECHNIQUES FOR USE WITH GENETIC ALGORITHMS

FIELD OF INVENTION

The present invention relates generally to the field of computing, and more particularly to automatic software visualization systems.

BACKGROUND

Software visualization may refer to the visualization of information related to software systems and the software development process through static, interactive, or animated visual representations. Automatic visualization systems may be a convenient method for software systems to provide data insights without implementing a burden on business users due to complexities involved in specifying visualizations. Many software visualization systems may employ a series of rules that match a predefined visualization template with an expected end user need. Once specified, the series of rules may be utilized to suggest a visualization that best fits a user's criteria from among a group of candidate visualizations.

SUMMARY

According to one embodiment, a method for generating a plurality of candidate visualizations. The method may include receiving a scenario description. The method may also include collecting a plurality of expert data using a training system based on the received scenario description. The method may further include generating at least one predictive model based on the collected plurality of expert data in order to execute the at least one generated predictive model during an application of a plurality of genetic algorithms.

According to another embodiment, a computer system for generating a plurality of candidate visualizations. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include receiving a scenario description. The computer system may also include collecting a plurality of expert data using a training system based on the received scenario description. The computer system may further include generating at least one predictive model based on the collected plurality of expert data in order to execute the at least one generated predictive model during an application of a plurality of genetic algorithms.

According to yet another embodiment, a computer program product for generating a plurality of candidate visualizations. The computer program product may include one or more computer-readable storage devices and program instructions stored on at least one of the one or more tangible storage devices, the program instructions executable by a processor. The computer program product may include program instructions to receive a scenario description. The computer program product may also include program instructions to collect a plurality of expert data using a training system based on the received scenario description. The computer program product may further include program instructions to generate at least one predictive model based on the collected plurality of expert data in order to execute the at least one generated predictive model during an application of a plurality of genetic algorithms.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
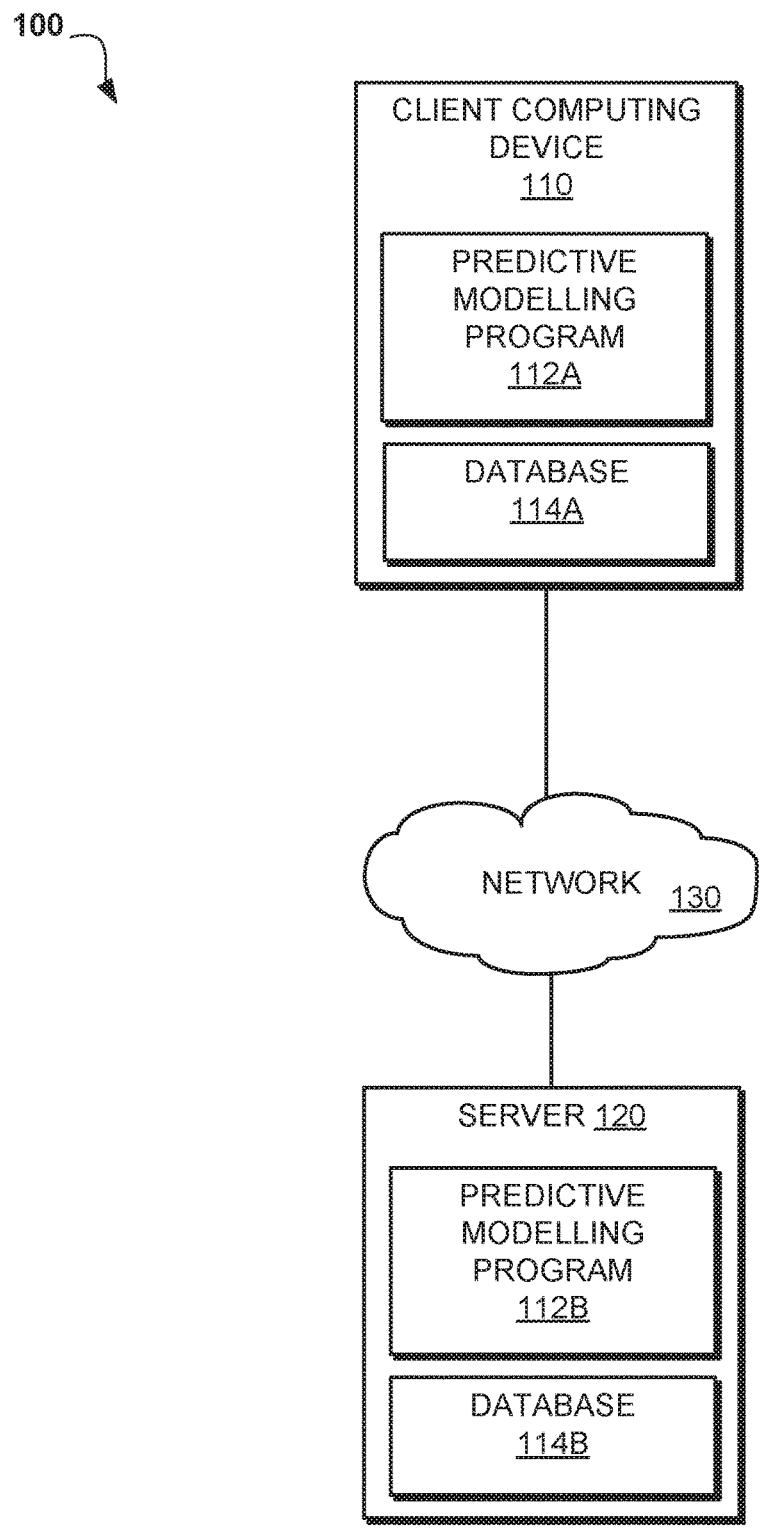
FIG. 1 is an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to automatic software visualization systems. The following described exemplary embodiments provide a system, method, and program product to, among other things, generate a predictive model capable of assessing the fitness of candidate visualizations during the implementation of genetic algorithms. Therefore, the present embodiment has the capacity to improve the technical field of automatic software visualization systems by automatically creating a broad use predictive model using historically collected data, which may conserve system and user resources.

As previously described, software visualization may refer to the visualization of information related to software systems and the software development process through static, interactive, or animated visual representations. Automatic visualization systems may be a convenient method for software systems to provide data insights without implementing a large burden on business users due to complexities involved in specifying visualizations. Software visualization systems may employ a series of rules created by a subject matter expert (SME) that select predefined visualization templates that best fit with an expected end user need. Software visualization systems may create visualizations that are made up of a series of actions.

When applying the series of rules created by an SME, software visualization systems may implement genetic algorithms to select visualizations that satisfy user needs. In computing, genetic algorithms may simulate the process of natural selection by representing a solution to a problem through a string of genes (i.e. a chromosome). The chromosome may have a value for a specified finite range or alphabet. For example, if a series of visualizations correspond to the "travelling salesman problem" and the salesman must travel to six points represented by the first six letters of the alphabet, a chromosome representing the visualization may be ACBEDF. Chromosome ACBEDF may illustrate that the salesman travels first to point A, then to point C, then to point B, and so on until the salesman has travelled to all points represented in the chromosome. When beginning an assessment of a visualization, an initial population of chromosomes may be created using various techniques, such as random subsets or complete enumeration of all possible values. For example, when assessing the above mentioned travelling salesman problem, chromosome ACBEDF, chromosome BEFDAC, and chromosome CDBAFE may each be randomly created as an initial population. Each chromosome may represent a different visualization to solve the problem. Furthermore, each point along the salesman's path may be individual actions that make up the visualization. For each generation of chromosomes, the population may be measured using the SME created series of rules to determine the fittest chromosomes within the population. For example, chromosome ACBEDF may be selected as the fittest chromosome among the initial population. Mutations upon chromosome ACBEDF may then be generated. Through an iterative process, the fittest chromosomes in each subsequent generation may be used to generate more chromosomes until a fittest chromosome is determined after a preconfigured number of generations. With respect to candidate visualizations being reviewed by SMEs, a fit candidate visualization may be a visualization that an SME may select as having favorable characteristics when representing a particular business problem.

Since each series of rules applied by the genetic algorithm to select the fittest chromosomes is specific to a predefined scenario, the set of rules may only be adequately applied to the specific scenario for which the series of rules was developed. For example, one set of rules may be developed to determine the fastest method for solving a given situation whereas another set of rules may be developed to determine the most cost effective method for solving a given problem. Therefore, each series of rules may have limited ability to adapt to more nuanced business needs of different scenarios since different scenarios may have varying business needs. Additionally, frequent creation of rules may be time consuming and burdensome on user resources. As such, it may be advantageous, among other things, to implement a system that automatically generates a set of predictive rules, or a predictive model, based on historical visualization data that can be used by genetic algorithms to assess the potential of candidate visualizations, or chromosomes.

According to one embodiment, evolutionary computing techniques, such as genetic algorithms, may implement a predictive model that mimics natural selection in order to discover a best fit visualization candidate across a very broad search spectrum of candidates. By implementing a training system, a series of data may be collected that relates to the business value assessments of SMEs for a series of visualizations. Using the collected data, a series of text and predictive models may be created and utilized by genetic algorithms to assist in determining whether an SME would favor a given visualization candidate. Real-time batch scoring using the created predictive models may provide the fitness function evaluation required by genetic algorithms to assess a set of population candidates.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate a predictive model using historical data that may be utilized by genetic algorithms to determine the fitness of candidate visualizations (i.e. likelihood of being selected by an SME). According to at least one implementation, the present embodiment may be capable of developing a predictive model from collected SME evaluation data. The predictive model may be utilized by genetic algorithms to assess the fitness of candidate visualizations for a specified problem through multiple generations of candidate visualizations.

Referring to FIG. 1, an exemplary networked computer environment 100 is depicted, in accordance with one embodiment. The networked computer environment 100 may include client computing device 110 and server 120 interconnected via communication network 130. According to at least one implementation, networked computer environment 100 may include a plurality of client computing devices 110 and server 120, only one of each being shown for illustrative brevity.

Communication network 130 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 110 may be, for example, a mobile device, a telephone, a personal digital assistant, a netbook, a laptop computer, a tablet computer, a desktop computer, or any type of computing device capable of running a program and accessing a network. Client computing device 110 may be capable of hosting predictive modeling program 112A, 112B, database 114A, 114B, and communicating with server 120 via network 130, in accordance with one embodiment of the invention. As will be discussed with reference to FIG. 5, client computing device 110 may include internal components 502*a* and external components 504*a*, respectively.

Server computer 120, or database server, may be a laptop computer, netbook computer, personal computer (PC), a desktop computer, or any programmable electronic device capable of hosting predictive modeling program 112A, 112B, database 114A, 114B, and communicating with client computing device 110 via network 130, in accordance with embodiments of the invention. As will be discussed with reference to FIG. 5, server computer 120 may include internal components 502*b* and external components 504*b*, respectively. Server 120 may also operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud.

According to the present embodiment, predictive modeling program 112A, 112B may be a program capable of generating a predictive model to assess the fitness of candidate visualizations similar to assessments conducted by subject matter experts. Predictive modeling program 112A, 112B may include training system 116A, 116B. Predictive modeling program 112A, 112B is explained in further detail below with respect to FIG. 2.

Training system 116A, 116B may be a program capable of generating and presenting hypothetical visualization scenarios to SMEs through a graphical user interface. Training system 116A, 116B may collect the SME data, such as action data, metric data, and opinion data, and store the collected data within database 114A, 114B. Training system 116A, 116B may be a cloud-based application that includes a central data storage facility (i.e. a repository), web-based deployment capabilities, and scalability to the number of visualization experts expected to provide training input. Training system 116A, 116B may be a bootstrap process that utilizes predictive models created from the collected SME data to generate hypothetical visualization scenarios in subsequent rounds of system training. Furthermore, training system 116A, 116B may support the gathering of input data from SMEs through the selection of a preferred visualization relative to other candidate visualizations and input of expert user opinions in freeform text.

Database 114A, 114B may be a repository capable of storing data related to a user-described scenario. The data within database 114A, 114B may be uploaded to predictive modeling program 112A, 112B by the user. Database 114A, 114B may also be capable of storing testing data received from training system 116A, 116B associated with test scenarios used by predictive modeling program 112A, 112B to identify SME preferences when determining candidate visualization fitness for a given scenario.

Figure 2:
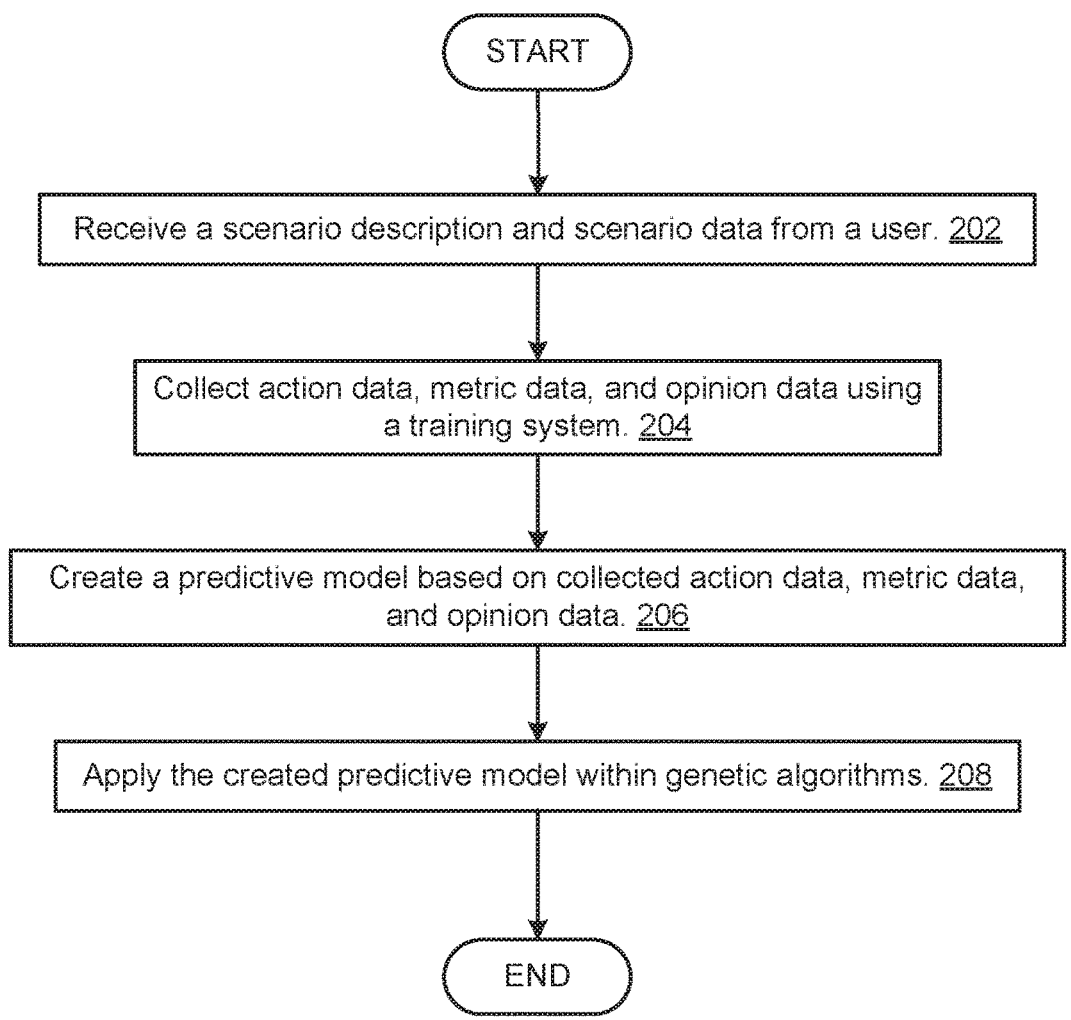
FIG. 2 illustrates a flowchart of the operational steps carried out by a program to generate a predictive model for determining subject matter expert preferences, in accordance with one embodiment of the present invention.

Referring now to FIG. 2, a flowchart 200 of the operational steps carried out by a program to generate a predictive model for determining subject matter expert preferences is depicted, in accordance with one embodiment of the present invention. At 202, predictive modeling program 112A, 112B may receive user-input text that describes a particular scenario and data that is associated with the user-described scenario. For example, the user may ask predictive modeling program 112A, 112B to generate a graph of the highest rated comedy movies within the previous decade. Additionally, the data associated with the user-described scenario may be uploaded to predictive modeling program 112A, 112B from a repository, such as database 114A, 114B.

At 204, predictive modeling program 112A, 112B may collect subject matter expert data related to sample visualizations similar to the user-described scenario using training system 116A, 116B. When building a model capable of predicting SME preferences within candidate visualizations, predictive modeling program 112A, 112B may first determine aspects and attributes that SMEs favor when determining the fitness of visualization candidates. Therefore, predictive modeling program 112A, 112B may collect SME data, such as action data, metric data, and opinion data, through the implementation of training system 116A, 116B. As previously described, predictive modeling program 112A, 112B may be capable of presenting hypothetical visualization scenarios to SMEs through training system 116A, 116B. Through the presentation of the hypothetical visualization scenarios, predictive modeling program 112A, 112B may be able to collect the SME data, such as action data, metric data, and opinion data, used to create a predictive model to use within a genetic algorithm.

Action data may be metadata capable of capturing aspects of the actions that make up the visualization. The action data may correspond directly to the visualization and may also define the steps for creating the visualization. Examples of action data that may be captured are as follows:

TABLE 1

Examples of types of action data.

| Name | Description |
| --- | --- |
| element | Element type in chart |
| elementCount | Number of elements |
| axes | Which axes are shown |
| transpose | Whether a transpose transform is used |
| polar | Whether polar is used |
| stack | Whether data is stacked |
| cluster | Whether data is clustered |

Metric data may be statistical measurements captured from within the visualization or the metadata of the fields used by the visualization. Examples of action data that may be captured are as follows:

TABLE 2

Examples of types of metric data.

| Name | Description |
| --- | --- |
| Type [x, y, color.symbol, color] | The field type |
| fieldCount | Total number of fields in the visualization |
| Count [x, y, color, symbol, size] | Total record count for the field |
| Skewness [x, y, color, symbol, size] | Skewness of the field |
| Kurtosis [x, y, color, symbol, size] | Kurtosis of the field |
| Category count [x, y, . . . ] | Number of unique categories |
| Association strength | Robust measure of field associations |
| Sort order [x, y, . . . ] | Any applied sorting |
| Visualization size (w, h) | Physical size allotted to the visualization |
| Emotions | Metrics for emotional scoring of visualizations |
| Transition | Scores continuity and direction from previous |
| [Spatial] Clutter factor | Measure of the clutter in a spatial layout |

Opinion data may be free text opinions regarding the visualization provided by SMEs as well as data regarding the applicable business domain and expertise level of the SME providing the opinion. Opinion data may be represented as natural language text provided by SMEs regarding the hypothetical visualizations. Examples of opinion data that may be captured are as follows:

TABLE 3

Examples of types of opinion data.

| Name | Description |
| --- | --- |
| Chosen | Whether an SME chose a specific visualization. |
| BusinessProblem | An explanation of the business problem address by the visualization. |
| BusinessDomain | A set of application domains for the visualization. |
| EffectivenessRating | A rating scale of the effectiveness of a given visualization. |
| Expertise | A description of the user's expertise in visualizations, such as "expert", "business analyst", or "novice". |

Furthermore, predictive modeling program 112A, 112B may implement training system 116A, 116B to collect the SME data. As previously described, training system 116A, 116B may be a cloud-based application that includes a central data storage facility, web-based deployment capabilities, and scalability to the number of visualization experts expected to provide training input. Training system 116A, 116B may be a bootstrap process that utilizes predictive models created from the collected SME data to generate hypothetical visualization scenarios in subsequent rounds of training. Furthermore, training system 116A, 116B may support the gathering of input data from SMEs through the selection of a preferred visualization relative to other candidate visualizations and input of expert user opinions in freeform text.

Next at 206, predictive modeling program 112A, 112B may create a predictive model based on the collected action data, metric data, and opinion data. Once collected, predictive modeling program 112A, 112B may analyze the collected action data, metric data, and opinion data to identify SME preferences when an SME is determining the fitness of a hypothetical visualization. Through analysis of the collected SME data, predictive modeling program 112A, 112B may be capable of determining the aspects and attributes of candidate visualizations favored by SMEs when solving a specific problem scenario. For example, when assessing the fitness of hypothetical candidate visualizations for the travelling salesman problem, predictive modeling program 112A, 112B may identify SME tendencies to favor the hypothetical candidate visualizations displaying the shortest distance travelled between points when the SMEs assess the hypothetical candidate visualizations. Knowing SMEs may favor candidate visualizations that implement the shortest travelling distance between points, predictive modeling program 112A, 112B may create a predictive model that favors candidate visualizations utilizing the shortest travelling distance between points for scenarios similar to the travelling salesman problem. Furthermore, predictive modeling program 112A, 112B may create multiple predictive models from the collected SME data to be applied for the same problem scenario. For example, a predictive model may be created to find the shortest distance travelled between points and a different predictive model may be created to find the shortest total time needed to visit all points. Additionally, predictive modeling program 112A, 112B may utilize various modeling techniques when creating the predictive model, such as followings:

TABLE 4

Examples of modeling techniques.

| Model Name | Inputs | Purpose |
| --- | --- | --- |
| Boosted Decision Tree | Metrics and Actions Fields | Predicts whether an expert would choose the visualization. |
| Text Categorization | Business Problem | Produces categorized text fields using free-form input text opinions from visualization experts. |
| Neural Network | Metrics and Actions Fields | Predicts the text categories that an expert may have for a given visualization candidate. |

In one embodiment of the present invention, predictive modeling program 112A, 112B may utilize the created predictive model within training system 116A, 116B when creating hypothetical candidate visualizations for SME review in step 204. Since a small sample size of SME data may be used to create the initial predictive model, predictive modeling program 112A, 112B may periodically update the created predictive model using SME data collected in subsequent rounds of data collection in step 204. Therefore, as previously described, training system 116A, 116B implemented by predictive modeling program 112A, 112B in step 204 may be an iterative bootstrap process that uses the created predictive model to improve subsequent generations of the hypothetical candidate visualizations presented to SMEs. Additionally, predictive modeling program 112A, 112B may draw upon models created using various modeling techniques, such as boosted decision trees, text categorization, and neural networking, to provide a set of choices to SMEs for later rounds of training.

Then at 208, predictive modeling program 112A, 112B may apply the created predictive model to assess the fitness of candidate visualizations generated by genetic algorithms. As previously described, genetic algorithms, in computing, may simulate the process of natural selection by representing a solution to a problem through the presentation of candidate visualizations. Predictive modeling program 112A, 112B may assess the candidate visualizations within a generation by assigning a fitness score to each candidate visualization based on user preconfigured business needs. For example, a user may enter free form text into a graphical user interface associated with predictive modeling program 112A, 112B that identifies a specific scenario and the business goals the user wishes a solution to the scenario to satisfy. Predictive modeling program 112A, 112B may begin the genetic algorithm process and favor candidate visualizations that include actions and metrics an SME may favor.

Once each candidate visualization within a generation of candidate visualizations have been assessed, the genetic algorithm may generate the next generation of candidate visualizations by mutating or cross-breeding the candidate visualizations in the current generation with the highest assigned fitness scores. Predictive modeling program 112A, 112B may then to assess the fitness of subsequent generations of candidate visualizations by providing a score for each candidate visualization until a solution is identified or a preconfigured number of generations has been reached.

Furthermore, when creating multiple predictive models, predictive modeling program 112A, 112B may utilize each predictive model when applying the predictive models within a genetic algorithm. Different predictive models may be used to derive fitness scores, which may be combined in to an overall fitness evaluation score for a given candidate visualization.

Figure 3:
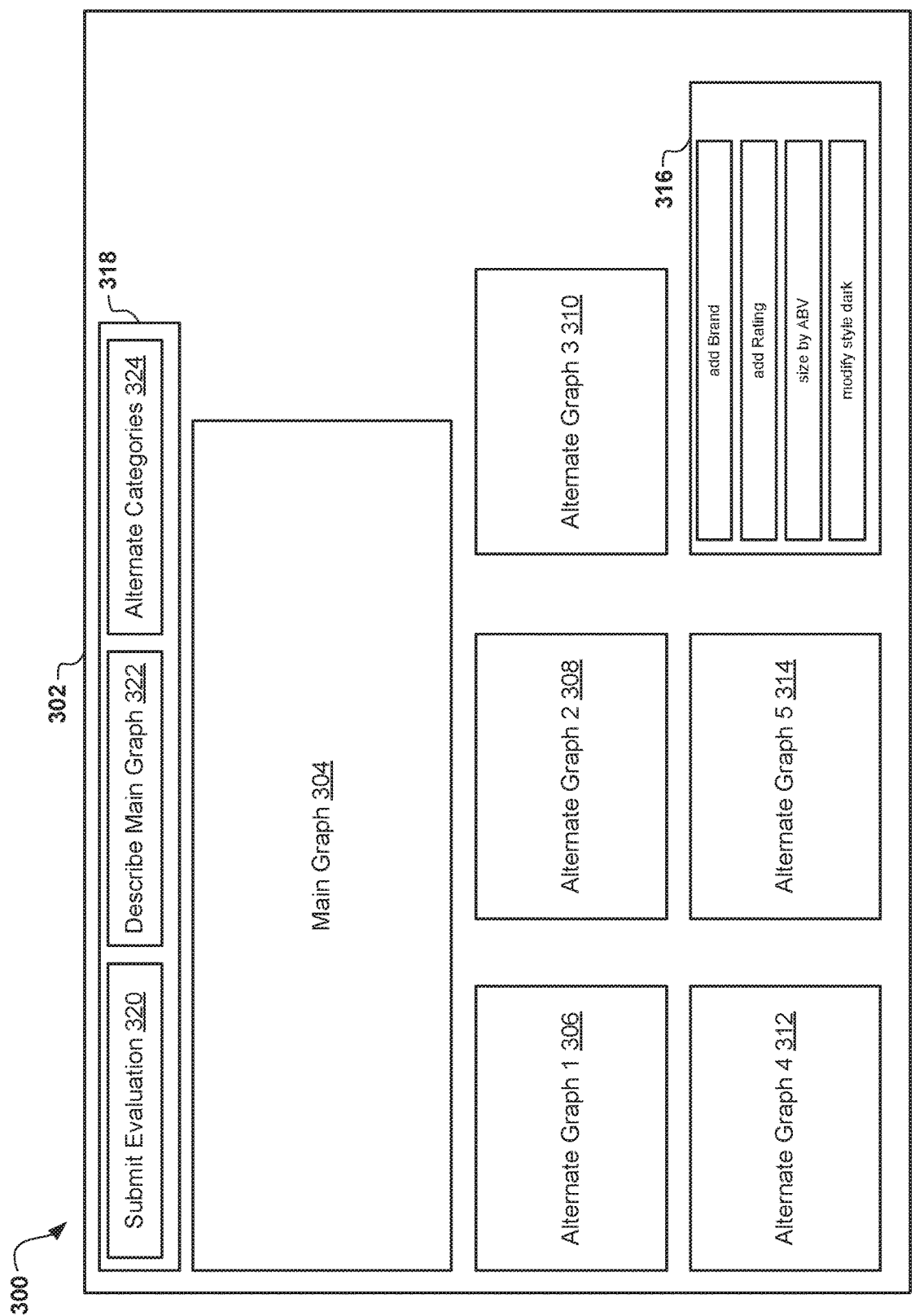
FIG. 3 is a functional block diagram of a graphical user interface comparing hypothetical visualizations within a training system, in accordance with one embodiment of the present invention.

Referring now to FIG. 3, a functional block diagram 300 of a graphical user interface comparing hypothetical visualizations within training system 116A, 116B is depicted, in accordance with one embodiment of the present invention. As previously described, predictive modeling program 112A, 112B may be capable of presenting hypothetical visualization scenarios, or hypothetical visualizations, to SMEs through training system 116A, 116B. Through the presentation of the hypothetical visualizations, predictive modeling program 112A, 112B may be able to collect the SME data, such as action data, metric data, and opinion data, used to create a predictive model to use within a genetic algorithm. Graphical user interface 302 may be used to display various hypothetical visualizations, such as main visualization 304, alternate visualization A 306, alternate visualization B 308, alternate visualization C 310, alternate visualization D 312, and alternate visualization E 314. Main visualization 304 may be an enlarged display of an alternate candidate visualization, such as alternate visualization A 306, alternate visualization B 308, alternate visualization C 310, alternate visualization D 312, and alternate visualization E 314, displayed elsewhere on graphical user interface 302. By selecting one of the alternate candidate visualizations, an SME using training system 116A, 116B may indicate a preference for the selected visualization over the other candidate visualizations. The SME choice of the selected visualization may be captured as SME data by predictive modeling program 112A, 112B.

Furthermore, graphical user interface 302 may include action filter 316. Action filter 316 may allow an SME utilizing training system 116A, 116B to manipulate the presentation of each of the alternate candidate visualizations. For example, an SME may wish for the candidate visualizations to be displayed with various brands along the y-axis and various product ratings along the x-axis in order to visualize which brands tend to receive better ratings. Additionally, graphical user interface 302 may include header menu 318, which may include various tabs and buttons, such as submit evaluation button 320, describe main graph button 322, and alternate categories button 324. Submit evaluation button 320 may allow an SME to enter freeform text that describes the business problems address by the candidate visualizations. Describe main graph button 322 may allow an SME to enter a description of the desired graph. The description submitted by an SME when utilizing the describe main graph button 322 may allow predictive modeling program 112A, 112B to learn which data creates particular characteristics in a visualization. Alternate categories button 324 may allow an SME to change the categories of alternate visualizations.

Figure 4:
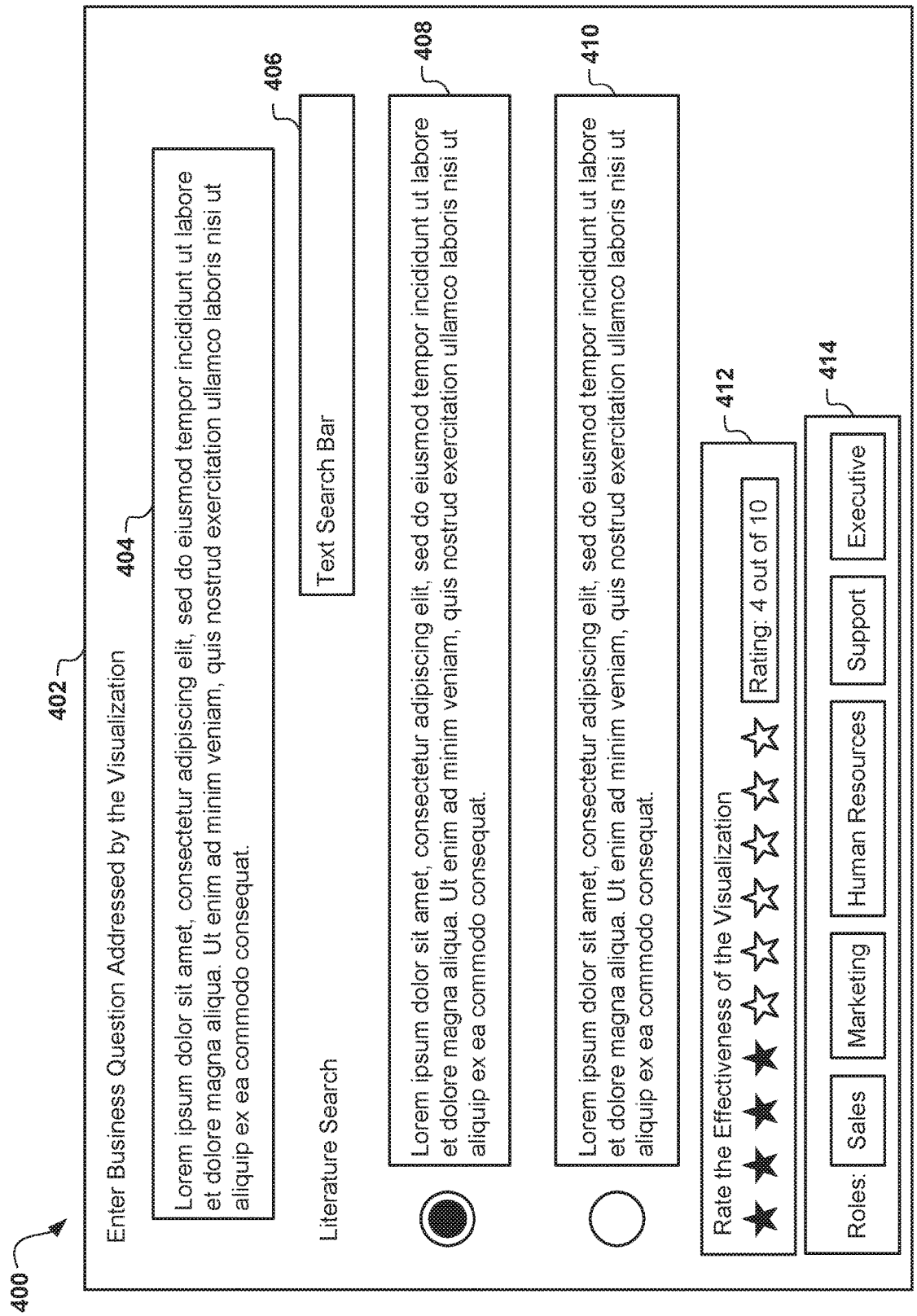
FIG. 4 is a functional block diagram of a graphical user interface for inputting expert user opinion data within a training system, in accordance with one embodiment of the present invention.

Referring now to FIG. 4, a functional block diagram 400 of a graphical user interface for inputting expert user opinion data within training system 116A, 116B is depicted, in accordance with one embodiment of the present invention. Predictive modeling program 112A, 112B may allow an SME to submit a freeform text opinion of a business problem that a hypothetical visualization candidate presented by training system 116A, 116B may solve. Graphical user interface 402 may allow an SME to submit freeform text opinion data that may then be captured by predictive modeling program 112A, 112B. An SME may enter freeform text into freeform text box 404 that describes the visualization presented in main visualization 304. Additionally, an SME may enter text in text search bar 406 to perform a literature search of similar visualization descriptions. Predictive modeling program 112A, 112B may search SME data within database 114A, 114B related to the SME input text in text search bar 406 and display the results in results window 408. Furthermore, an SME may provide a rating for a visualization within rating window 410. For example, an SME may rate a visualization in a ten point rating system within rating window 410. Additionally, role window 412 may list each department or category to which the SME determines the visualization may apply, such as sales, marketing, human resources, support, and executive.

Figure 5:
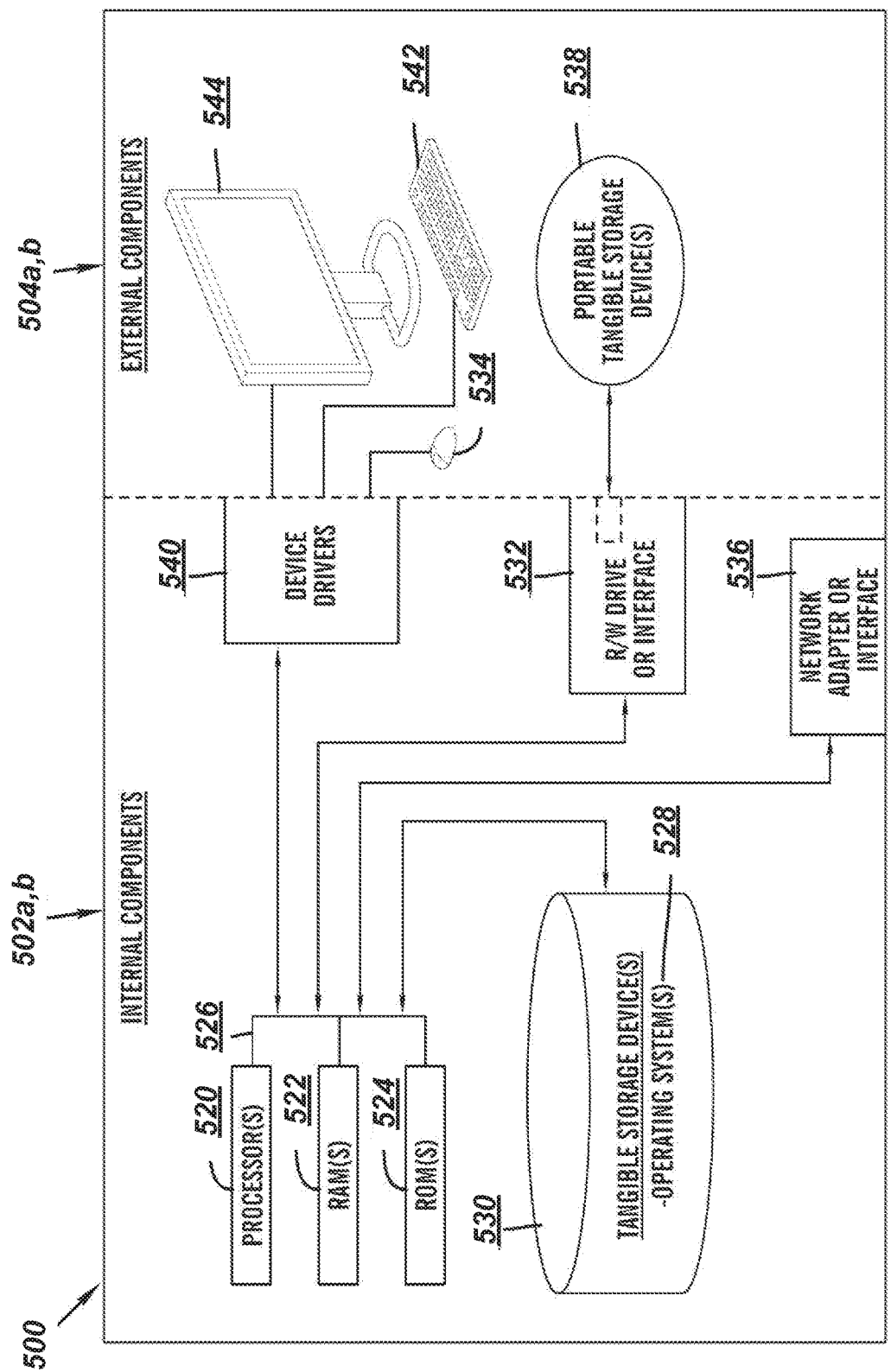
FIG. 5 depicts a cloud computing node according to an embodiment of the present invention.

FIG. 5 is a block diagram 500 of internal and external components of computer 110 and server 120 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 502, 504 is representative of any electronic device capable of executing machine-readable program instructions. Data processing system 502, 504 may be representative of a smart phone, a computer system, PDA, or other electronic devices. Examples of computing systems, environments, and/or configurations that may be represented by data processing system 502, 504 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 110 and network server 120 may include respective sets of internal components 502 a,b and external components 504 a,b illustrated in FIG. 5. Each of the sets of internal components 502 include one or more processors 520, one or more computer-readable RAMs 522 and one or more computer-readable ROMs 524 on one or more buses 526, and one or more operating systems 528 and one or more computer-readable tangible storage devices 530. The one or more operating systems 528, predictive modeling program 112A and database 114A in client computer 110; and predictive modeling program 112B and database 114B in network server 120 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as predictive modeling program 112A, 112B, can be stored on one or more of the respective portable computer-readable tangible storage devices 538, read via the respective R/W drive or interface 532 and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. Predictive modeling program 112A and database 114A in client computer 110 and predictive modeling program 112B and database 114B in network server 120 can be downloaded to client computer 110 and network server 120 from an external computer via a network (for example, the Internet, a local area network or other, wide area network) and respective network adapters or interfaces 536. From the network adapters or interfaces 536, predictive modeling program 112A and database 114A in client computer 110 and predictive modeling program 112B and database 114B in network server 120 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532 and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
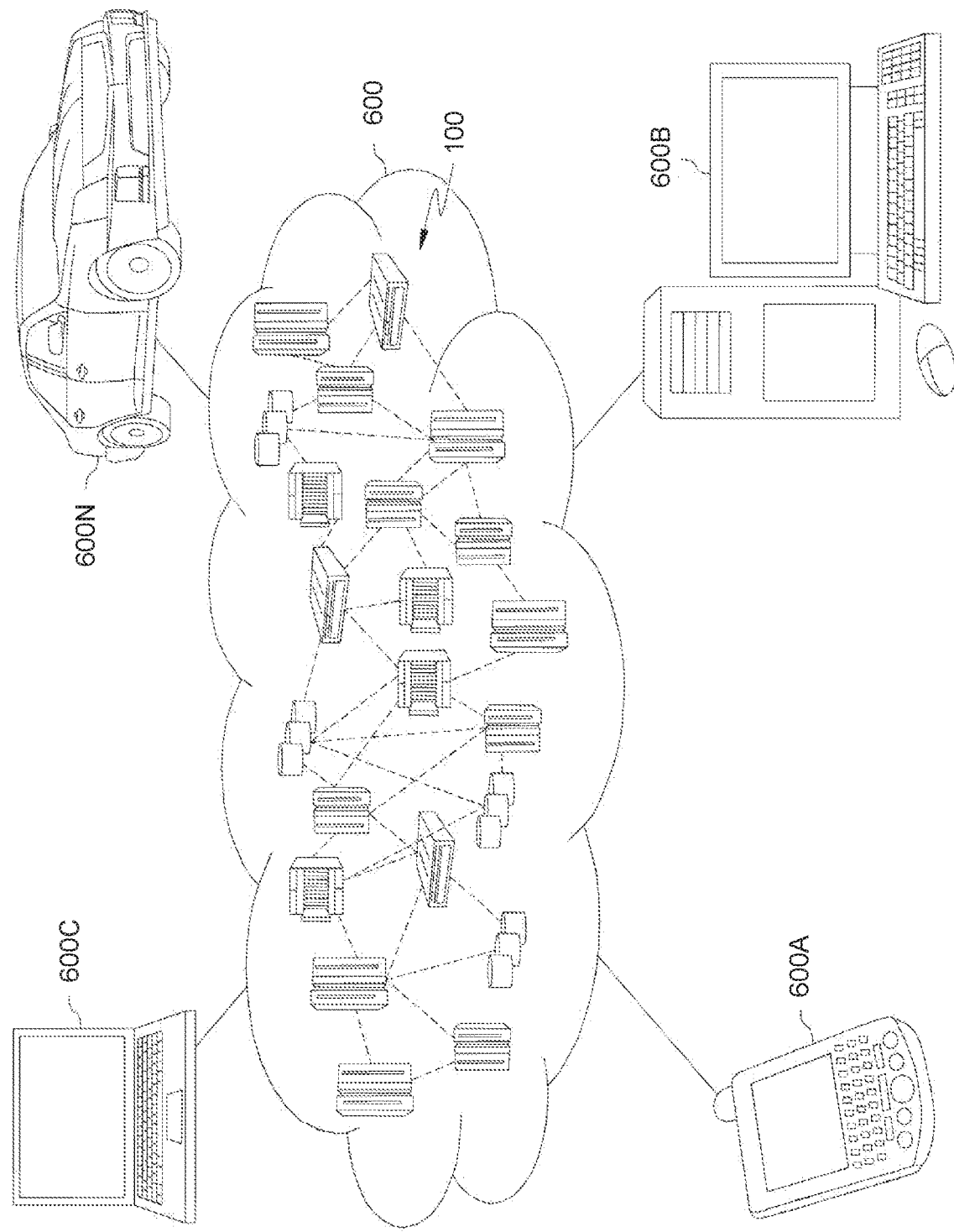
FIG. 6 depicts a cloud computing environment according to an embodiment of the present invention.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
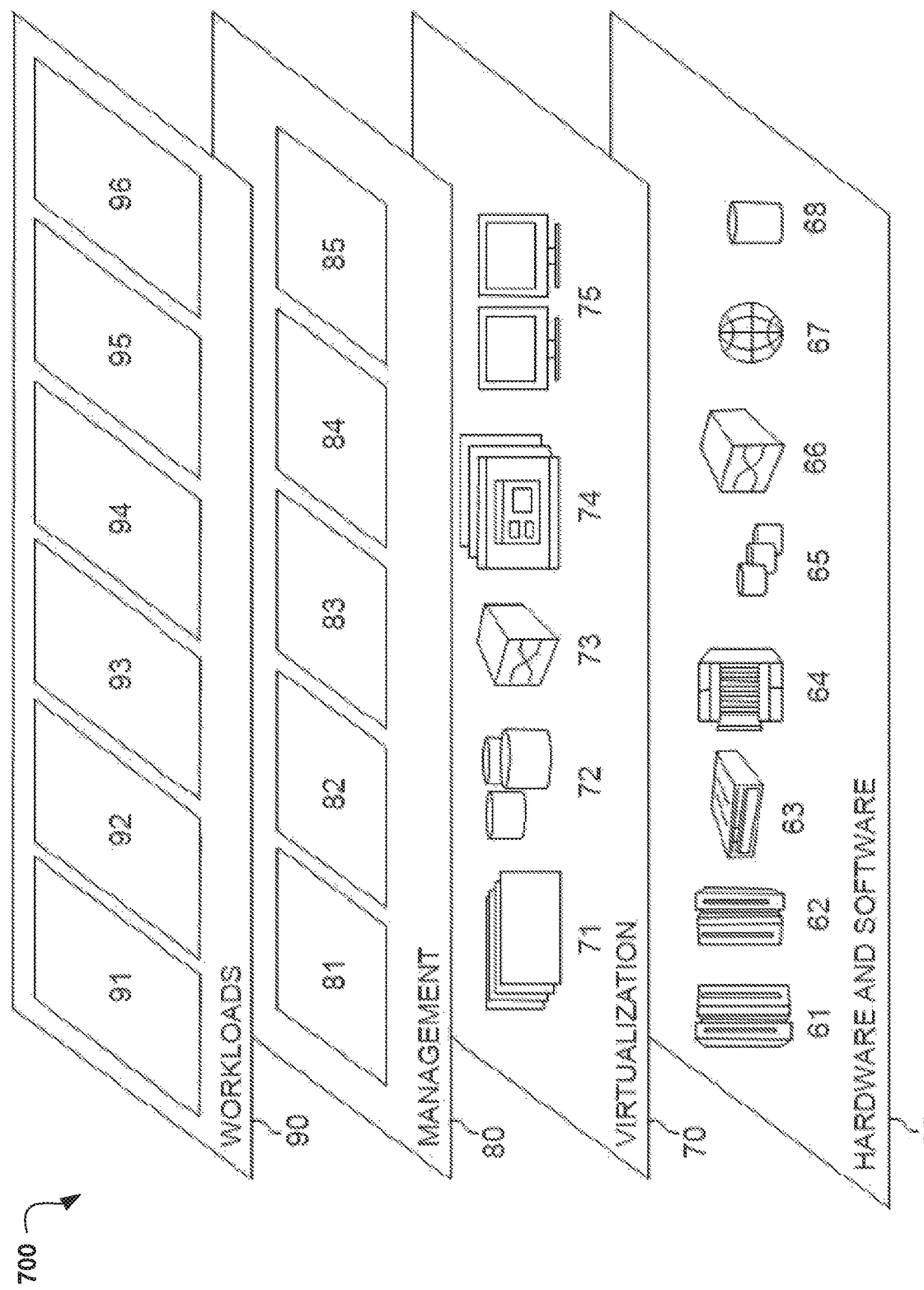
FIG. 7 depicts abstraction model layers according to an embodiment of the present invention.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive model creation using historically collected expert data 96. The predictive models may be utilized to determine the business value fitness of candidate visualizations for use within genetic algorithms.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for generating a plurality of candidate visualizations, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving, by a processor, a scenario description;
collecting a plurality of expert data using a training system based on the received scenario description, wherein the training system is a bootstrap process, wherein the training system is a cloud-based application that generates and presents hypothetical visualization scenarios to subject matter experts through a graphical user interface with which the subject matter experts interact, and wherein the plurality of expert data comprises metric data, and wherein the plurality of metric data comprises skewness of a field and kurtosis of a field;
generating at least one predictive model based on the plurality of collected expert data, wherein the training system utilizes the at least one predictive model to generate one or more subsequent candidate visualizations;
calculating a fitness score for each of a plurality of candidate visualizations by executing the at least one generated predictive model during an application of a plurality of genetic algorithms; and
generating a next generation of candidate visualizations using the plurality of genetic algorithms by mutating or cross-breeding candidate visualizations with a calculated fitness score that satisfies a preconfigured threshold value.

2. The computer system of claim 1, wherein the plurality of expert data is further selected from a group consisting of a plurality of action data and a plurality of opinion data.

3. The computer system of claim 2, wherein the plurality of action data is metadata that captures aspects of actions that make up the hypothetical visualization scenario, and the plurality of action data is selected from a group consisting of element type, number of elements, shown axes, whether a transpose transform is used, whether polar is used, whether data is stacked, and whether data is clustered.

4. The computer system of claim 2, wherein the plurality of metric data is statistical measurements captured from within the hypothetical visualization scenario or metadata of fields used within the hypothetical visualization scenario, and wherein the plurality of metric data is further selected from a group consisting of field type, total number of fields in the hypothetical visualization scenario, total record count for a field, number of unique categories, robustness measure of field associations, applied sorting, physical size allotted to the visualization, metrics for emotional scoring of visualizations, continuity and direction values, and clutter factor in a spatial layout.

5. The computer system of claim 2, wherein the plurality of opinion data comprises free text opinions regarding the hypothetical visualization scenario provided by subject matter experts, data regarding an applicable business domain, and expertise level of each subject matter expert providing an opinion of the hypothetical visualization scenario, and wherein the plurality of opinion data is selected from a group consisting of whether a subject matter expert chose a specific hypothetical visualization scenario from a group of hypothetical visualization scenarios, an explanation of the business problem addressed by hypothetical visualization scenario, a set of application domains for the hypothetical visualization scenario, a rating scale of the effectiveness of a given hypothetical visualization scenario, and a description of a user's expertise in visualizations.

6. The computer system of claim 1, wherein the training system collects the plurality of expert data through at least one of an expert selecting a preferred visualization within a plurality of candidate visualizations and an expert submitting an opinion related to the preferred visualization.

7. The computer system of claim 1, wherein the training system includes at least one of a central data storage facility, a plurality of web-based deployment capabilities, and scalability to a corresponding number of experts using the training system.

8. The computer system of claim 1, further comprising:
updating the training system based on the at least one generated predictive model.

9. The computer system of claim 1, wherein generating the at least one predictive model comprises using boosted decision trees, text categorization, and neural networking.

10. A computer program product for generating a plurality of candidate visualizations, the computer program product comprising:
one or more computer-readable tangible storage medium and program instructions stored on at least one of the one or more tangible storage medium, the program instructions executable by a processor, the program instructions comprising:
program instructions to receive, by a processor, a scenario description;
program instructions to collect a plurality of expert data using a training system based on the received scenario-description, wherein the training system is a bootstrap process, wherein the training system is a cloud-based application that generates and presents hypothetical visualization scenarios to subject matter experts through a graphical user interface with which the subject matter experts interact, and wherein the plurality of expert data comprises metric data, and wherein the plurality of metric data comprises skewness of a field and kurtosis of a field;
program instructions to generate at least one predictive model based on the plurality of collected expert data, wherein the training system utilizes the at least one predictive model to generate one or more subsequent candidate visualizations;
program instructions to calculate a fitness score for each of a plurality of candidate visualizations by executing the at least one generated predictive model during an application of a plurality of genetic algorithms; and
program instructions to generate a next generation of candidate visualizations using the plurality of genetic algorithms by mutating or cross-breeding candidate visualizations with a calculated fitness score that satisfies a preconfigured threshold value.

11. The computer program product of claim 10, wherein the plurality of expert data is further selected from a group consisting of a plurality of action data and a plurality of opinion data.

12. The computer program product of claim 11, wherein the plurality of action data is metadata that captures aspects of actions that make up the hypothetical visualization scenario, and the plurality of action data is selected from a group consisting of element type, number of elements, shown axes, whether a transpose transform is used, whether polar is used, whether data is stacked, and whether data is clustered.

13. The computer program product of claim 11, wherein the plurality of metric data is statistical measurements captured from within the hypothetical visualization scenario or metadata of fields used within the hypothetical visualization scenario, and wherein the plurality of metric data is further selected from a group consisting of field type, total number of fields in the hypothetical visualization scenario, total record count for a field, number of unique categories, robustness measure of field associations, applied sorting, physical size allotted to the visualization, metrics for emotional scoring of visualizations, continuity and direction values, and clutter factor in a spatial layout.

14. The computer program product of claim 11, wherein the plurality of opinion data comprises free text opinions regarding the hypothetical visualization scenario provided by subject matter experts, data regarding an applicable business domain, and expertise level of each subject matter expert providing an opinion of the hypothetical visualization scenario, and wherein the plurality of opinion data is selected from a group consisting of whether a subject matter expert chose a specific hypothetical visualization scenario from a group of hypothetical visualization scenarios, an explanation of the business problem addressed by hypothetical visualization scenario, a set of application domains for the hypothetical visualization scenario, a rating scale of the effectiveness of a given hypothetical visualization scenario, and a description of a user's expertise in visualizations.

15. The computer program product of claim 10, wherein the training system collects the plurality of expert data through at least one of an expert selecting a preferred visualization within a plurality of candidate visualizations and an expert submitting an opinion related to the preferred visualization.

16. The computer program product of claim 10, wherein the training system includes at least one of a central data storage facility, a plurality of web-based deployment capabilities, and scalability to a corresponding number of experts using the training system.

17. The computer program product of claim 10, further comprising:
program instructions to update the training system based on the at least one generated predictive model.

18. The computer program product of claim 10, wherein generating the at least one predictive model comprises using boosted decision trees, text categorization, and neural networking.

* * * * *